United States Patent

Quirk et al.

[19]

[11] Patent Number: 6,052,409
[45] Date of Patent: Apr. 18, 2000

[54] DEVICE AND METHOD FOR GENERATING AND DETECTING TONES IN A DIGITAL DATA COMMUNICATIONS DEVICE

[75] Inventors: Patrick J. Quirk; Todd W. Lumpkin; Christian Paul Nelson, all of Huntsville, Ala.

[73] Assignee: Motorola Inc., Schaumburg, Ill.

[21] Appl. No.: 08/846,763

[22] Filed: Apr. 30, 1997

[51] Int. Cl.[7] .................................................. H04L 12/66
[52] U.S. Cl. ...................... 375/220; 375/221; 379/93.06; 370/249; 370/463
[58] Field of Search ..................... 375/220, 221, 375/222, 377; 379/93.06, 229, 339, 93.05, 93.07; 370/463, 249

[56] References Cited

U.S. PATENT DOCUMENTS 4,751,696  6/1988  Black ........................................ 379/235
5,708,663  1/1998  Wright et al. ............................ 370/524
5,931,928  8/1999  Brennan et al. ......................... 710/68

*Primary Examiner*—Amanda T. Le
*Attorney, Agent, or Firm*—John W. Powell; Joanne N. Pappas

[57] ABSTRACT

In a digital communication device adapted to be coupled to a digital network and having an analog port adapted for interconnecting an analog device to the digital communication device, a device for generating and detecting tones, includes: a processor programmed to selectively generate one of a first set of digital tones in a generation mode and to detect one of a second set of digital tones in a detection mode; and a conversion circuit, operably coupled to the processor, adapted to convert the one of the first set of digital tones generated by the processor in the generation mode to an analog tone and transmit the analog tone to the analog device; the conversion circuit further being adapted to convert an analog tone received from the analog device to the one of the second set of digital tones and transmit the digital tone to the processor when the processor is in the detection mode.

18 Claims, 5 Drawing Sheets

TONES GENERATED IN PROCESSOR AND SENT TO ANALOG DEVICE

TONES DETECTED BY PROCESSOR AND GENERATED BY ANALOG DEVICE

DEVICE AND METHOD FOR GENERATING AND DETECTING TONES IN A DIGITAL DATA COMMUNICATIONS DEVICE

FIELD OF THE INVENTION

This invention relates in general to digital data communication devices having at least one analog port for interconnecting to an analog device, and more particularly to digital data communication devices which generate and detect tones as a means of transferring information between the digital data communications device and the analog device.

BACKGROUND

Presently, digital data communication devices, such as ISDN terminal adapters, provide at least one analog port which enables an analog device, e.g., a telephone, fax or a modem, to be interconnected to the terminal adapter. Terminal adapters are capable of receiving analog voice and/or voice-band data (fax, analog modem), converting it to digital form by means of a codec (coder/decoder), and transmitting the digitized voice/voice-band data over the digital network. Also, terminal adapters are capable of receiving digitized voice/voice-band data from the digital network, converting it to analog form with the codec and providing the analog to the analog device. There are typically a suite of single and dual tones, such as dial-tone, ring-back, busy and DTMF (Dual Tone Multi-Frequency), which provide information to the digital network and include information from the digital network, that must be either generated or detected by the analog device to provide standard analog voice, fax or data services.

Tones that are generated by the analog device include DTMF tones which correspond to the numbers 0–9 and the "*" and "#" symbols that may be dialed by the analog device in order to establish a connection with another device. When the analog device dials a telephone number, the tones corresponding to the number are received and decoded by the terminal adapter and then forwarded to the digital network switch, which may send an indication to the analog device regarding the connection status of the call via a network provided tone or announcement.

Tones that must be detected by the analog device include, e.g., the dial-tone, ring-back, and busy tones, which are monitored to determine connection status. The dial-tone is received by the analog device when it goes off-hook to place a call to another device. The ring-back tone is received by the analog device after it attempts to place a call to another device and that device is not busy. The busy tone is received by the analog device after it attempts to place a call to another device and that device is busy.

Present terminal adapters typically include a DTMF decoder which receives from the analog device the DTMF tones and outputs a digital representation of the tones to the microprocessor of the terminal adapter. The tones that the analog device must detect are either generated by the network or the network provides signals representing the tones and the terminal adapter must generate the tones. For example, in the US, ISDN networks generate the tones and the terminal adapter coverts the tones to analog with the codec and transfers the tones to the analog device through a hybrid circuit. In contrast, in Japan, ISDN networks do not generate the tones and therefore the terminal adapter must generate the tones. Typically, the terminal adapter must be capable of operating either way and depending on the type of network, must be configured accordingly.

In order to generate the tones, the processor of the terminal adapter includes in its memory tables, samples corresponding to the various types of tones that it must be capable of generating. Depending on the signal received from the network (e.g., dial-tone, ring-back. etc.), the appropriate samples are output from the processor to a digital-to-analog converter (DAC). The DAC converts the digital samples to analog and provides the analog signals (tones) to the hybrid circuit which passes the tones to the analog device. The analog device then responds accordingly based on the tone received.

In order for a terminal adapter to receive tones generated by the analog device and generate tones to be provided to the analog device, it must include, in addition to the codec, a DTMF decoder and a DAC. Hence there remains a need for a digital data communications device that can receive tones generated by the analog device and generate tones to be provided to the analog device without the need for additional hardware components, such as the DTMF decoder and the DAC.

DETAILED DESCRIPTION OF A PREFERRED EMBODIMENT

The present invention is directed to an improved device and method for enabling a digital data communication device to generate and detect tones as a means of transferring information between the digital data communications device and an analog device connected thereto. It is not directed to the particular type of tones generated and detected or their utility to the digital communication device or the analog device, which is apparent to those skilled in the art. Moreover, although in the preferred embodiment the digital communication device is described to be an ISDN terminal adapter, this is not a necessary limitation of this invention. This invention is applicable to all types of digital communication devices which enable connection of one or more analog devices to provide standard analog voice, fax or data services over the digital networks to which the digital communication devices are connected.

Figure 1:
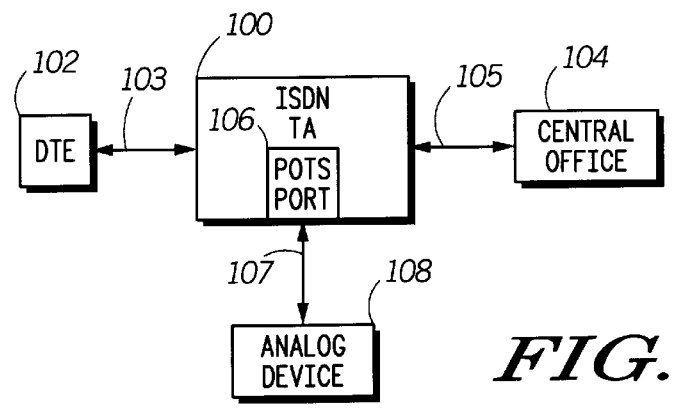
FIG. 1 is a block diagram illustrating a typical terminal adapter connected to a DTE, a telephone company central office, and an analog device through an analog port.

There is shown in FIG. 1 a typical arrangement for providing analog service using an ISDN terminal adapter. Terminal adapter 100 is coupled to DTE (data terminal equipment) 102, such as a personal computer, over bus 103 and to central office ("CO") 104 in a switched digital network over line 105. Terminal adapter 100 includes an analog port 106 which enables an analog device 108, such as a telephone, modem or facsimile machine, to be interconnected thereto over line 107 for transmission of analog voice and/or analog voice-band data over the switched digital network in a known manner.

Figure 2:
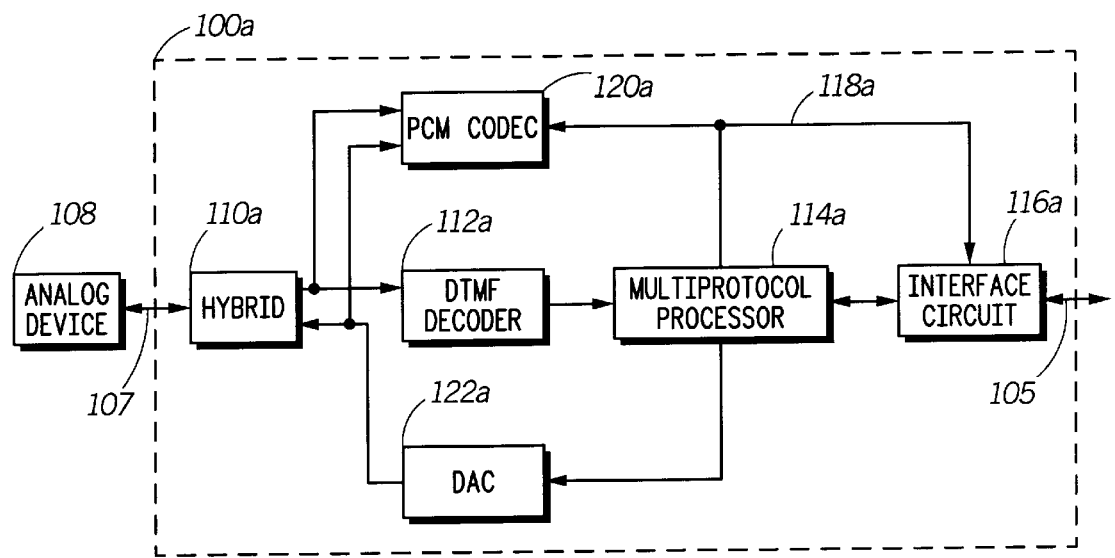
FIG. 2 is a block diagram of a portion of the circuitry of a prior art terminal adapter capable of generating and detecting tones as a means of transferring information between the terminal adapter and the analog device.

A prior art terminal adapter 100a, FIG. 2, such as a Motorola BitSURFR® terminal adapter, can support analog voice and voice-band data services as described with regard to FIG. 1. As noted in the Background section, there are typically a suite of single and dual tones, such as dial-tone, ring-back, busy and DTMF (Dual Tone Multi-Frequency), that must be either generated or detected by the analog device to provide standard analog voice, fax or data services.

When, for example, analog device 108 attempts to place a call, certain tones in the set of DTMF tones which correspond to the numbers 0–9 and the "*" and "#" symbols to be dialed by the analog device are generated. Analog device 108 includes a tone generator which generates the DTMF tones and supplies the tones to the hybrid circuit 110a of terminal adapter 100a. The hybrid circuit 110a couples the DTMF tones to DTMF decoder 112a. DTMF decoder 112a converts the analog tones into digital representations of the number or symbol dialed and provides the digital representations to multiprotocol processor 114a. For example, a tone representing the number "1" input to DTMF decoder 112a may cause it to output a "0001". Microprocessor 114a then supplies the DTMF digits provided to it from DTMF decoder 112a to interface circuit 116a and line 105 for transmission over the digital network.

The set of tones that the analog device must detect (e.g. the dial-tone, ring-back, and busy tones) are either generated by the network or the network provides signals representing the tones and the terminal adapter must generate the tones. When the network to which terminal adapter 100a is connected generates the tones, microprocessor 114a is configured to pass the tones received from line 105 and the digital network over bus 118a to PCM codec 120a. PCM codec 120a converts the digital tones to analog form and through hybrid circuit 110a couples the tones to analog device 108.

In order to generate the tones, processor 114a of the terminal adapter 100a includes, in its memory tables, samples corresponding to the various types of tones in the set that it must be capable of generating. Depending on the signal received from the network (e.g., busy, ring-back . . . etc.) or from the analog device (off-hook, indicating the need for a dial tone), the appropriate samples are output from the processor to a digital-to-analog converter (DAC) 122a. DAC 122a converts the digital samples to analog and provides the analog signals (tones) through hybrid circuit 110a to analog device 108 which then responds accordingly based on the tone received.

Figure 3:
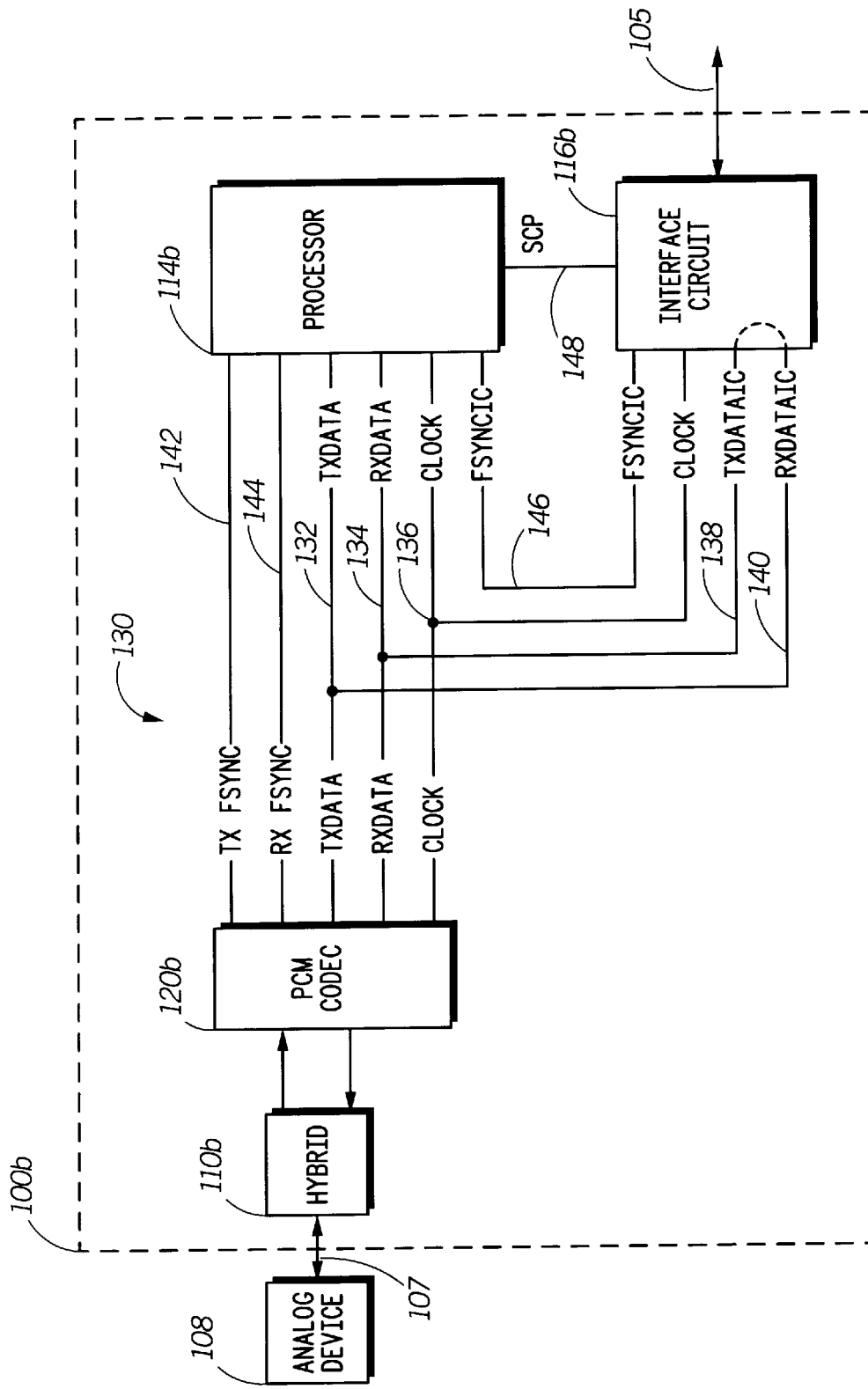
FIG. 3 is a block diagram of a portion of the circuitry of a terminal adapter in accordance with the present invention which generates and detects tones as a means of transferring information between the terminal adapter and the analog device.

FIG. 3 is a block diagram of a portion of the circuitry of a terminal adapter in accordance with the present invention which generates tones to be provided to and detected by analog device 108 and detects tones generated by analog device 108. Analog device 108 is coupled to hybrid circuit 110b of terminal adapter 100b. Hybrid circuit 110b may be of the same type as hybrid circuit 110a in FIG. 2. Terminal adapter 110b is coupled to line 105 through interface circuit 116b, which is a U-interface transceiver, such as a Motorola U-interface transceiver, MC145572, which supports a loop-back mode for each bearer (B) channel. In the loop-back mode, interface circuit 116b transmits back to PCM (pulse code modulation) bus 130 the data it received from bus 130, instead of transmitting the received data over line 105 which it would normally do when not in loop-back mode. Interface 116b must be capable of supporting a loop-back mode in each B-channel, while maintaining normal operation in the other B-channel. Processor 114b may be the same type of processor that is used in terminal adapter 100a, FIG. 2, such as a Motorola 68302 microprocessor.

PCM bus 130, which in this embodiments a GCI (general circuit interface) bus , includes a transmitter line (TXDATA) 132 interconnected to the transmitters of the processor 114b and PCM codec 120b and a receiver line (RXDATA) 134 connected to the receivers of the processor 114b and PCM codec 120b. There is a clock signal line (CLOCK) 136 interconnected to processor 114b, interface circuit 116b and PCM codec 120b which maintains the timing of the signaling with these three devices. The transmitter line ($TXDATA_{IC}$) 138 of interface circuit 116b is interconnected to receiver line (RXDATA) 134 and receiver line ($RXDATA_{IC}$) 140 of interface circuit 116b is interconnected to transmitter line (TXDATA) 132. There is a TX FSYNC line 142 from processor 114b to PCM codec 120b which provides a synchronization signal to the PCM codec 120b transmitter circuit indicating the beginning of the appropriate B-Channel in the GCI frame and there is a RX FSYNC line 144 from processor 114b to PCM codec 120b which provides a synchronization signal to the PCM codec 120b receiver circuit indicating the beginning of the appropriate B-Channel in the GCI frame. A GCI frame contains eight (8) bits of data for each B-channel and 2 bits of data for the D-channel. $FSYNC_{IC}$ line 146 provides a synchronization signal to processor 114b from interface circuit 116b indicating the beginning of the GCI frame. Interface circuit 114b is the master providing the GCI frame synchronization signal to processor 114b (slave) and the clock signal to processor 114b and PCM codec 120b (slave).

A three-state (high, low, and high impedance) PCM bus, such as GCI bus 130, with high impedance which enables both the transmitter of SCC 152 and the transmitter of PCM codec 120b to be connected to the bus at the same time and allows PCM codec 120b to be used in the straight PCM mode must be used with this invention. Even though one of the transmitters is disabled when the other is enabled, the disabled transmitter still outputs "ones" to the bus. This is not a problem for this type of bus. Also, this bus provides separate, independent control over the transmitter and receiver of PCM codec 120b which is necessary with the present invention.

The processor 114b is also connected to interface circuit 116b via a synchronous serial interface SCP 148. This is a control and status interface allowing the processor 114b to configure and command interface circuit 116b into the proper mode of operation. This is the mechanism by which processor 114b is able to place interface circuit 116b in loop back mode or take it out of loop back mode.

As described below, this unique configuration enables two slaved units, namely processor 114b and PCM codec 120b, to communicate over a three-state PCM bus, bus 130, when the master unit, interface circuit 116b, is in a loop-back mode. Typical PCM buses allow communication between master and slave, but not between slaved units as with the present invention.

As described below with regard to FIGS. 4–7, terminal adapter 100b, according to the present invention, is capable of generating tones to be provided to an analog device and detecting tones generated by the analog device without the need of a DTMF decoder circuit and a DAC in addition to the codec, as required by prior art terminal adapter 100a, FIG. 2.

Figure 4:
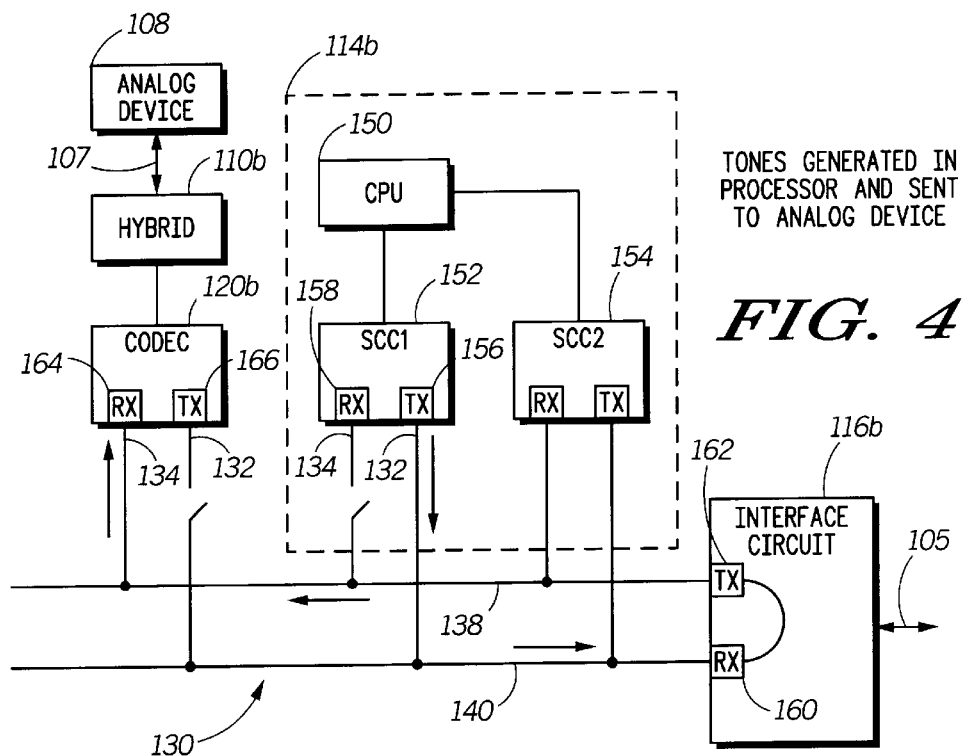
FIG. 4 is a block diagram of the circuitry in FIG. 3 illustrating tone generation by the processor.

The flow of tones generated in processor 114b and provided to analog device 108 is illustrated in FIG. 4. The digital samples of a particular tone (e.g., dial-tone, busy tone. etc.) are provided by CPU 150 to serial communications controller (SCC1) 152. There is a second serial communications controller (SCC2) 154 interconnected to CPU 150 and bus 130. Each controller is configured to carry a different B-channel of the ISDN line. The tones generated and detected by processor 114b according to this invention are provided to CPU 150 by one of the controllers, in this case SCC1 152, while the other B-channel (if it is active) maintains normal operation. There is another serial communication controller (not shown) which carries the D-channel signaling information to and from the central office switch. It should be noted that although the serial communication controllers are depicted to be within processor 114b, this is not a necessary limitation of the invention. The serial communication controllers could be implemented as components separate from processor 114b.

The digital samples of the appropriate tones are transmitted by transmitter 156 of SCC1 152 over TXDATA line 132 and RXDATA$_{IC}$ line 140 to the receiver 160 of interface circuit 116b. Because interface circuit 116b is in the loop-back mode for the B-channel associated with SCC1 152, the digital samples of the appropriate tones provided to receiver 160 are not directed to the digital network over line 105, but rather they are provided to transmitter 162 of interface circuit 116b and transmitted on transmitter line TXDATA$_{IC}$ 138 and receiver line RXDATA 134. Since the tones are directed to analog device 108, receiver 164 of codec 120b is enabled, while receiver 158 of SCC1 152 is disabled. This directs the generated samples of the tone from processor 114b to analog device 108.

Figure 5:
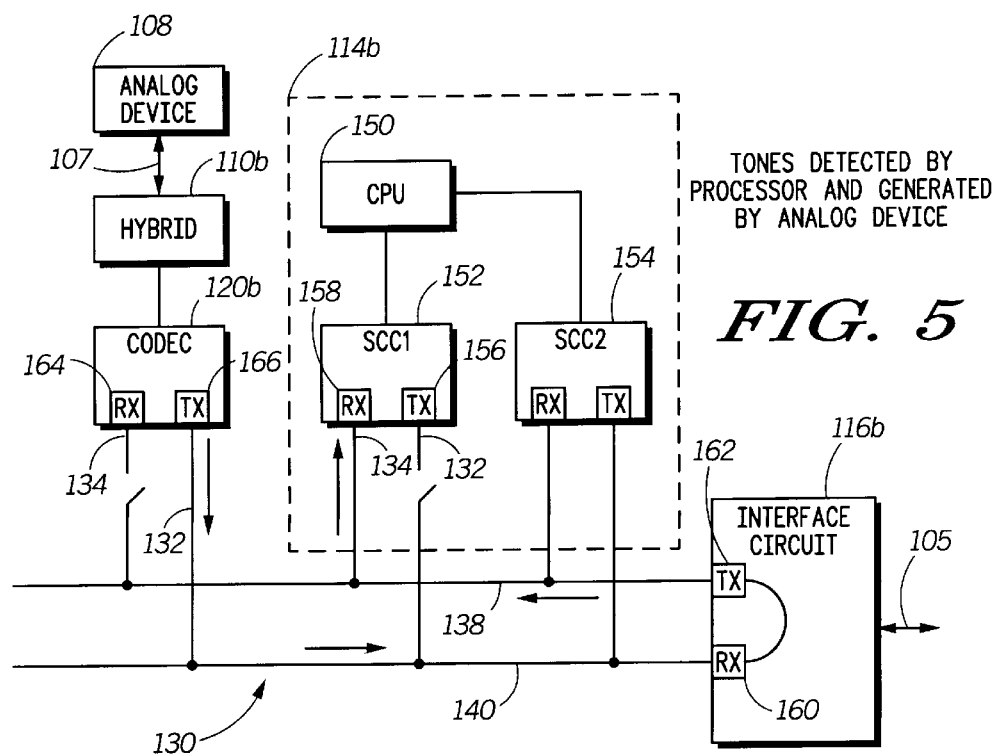
FIG. 5 is a block diagram of the circuitry in FIG. 3 illustrating tone detection by the processor.

The flow of tones generated in analog device 108 and detected by processor 114b is illustrated in FIG. 5. When analog device 108 desires to generate a tone, e.g., a DTMF tone, for detection by processor 114b, receiver 164 of codec 120b is disabled and transmitter 166 of codec 120b is enabled while receiver 158 of SCC1 152 is enabled and transmitter 156 is disabled. The tones generated in analog device 108 are converted into digital samples by codec 120b and transmitted by transmitter 166 over TXDATA line 132 and RXDATA$_{IC}$ line 140 to the receiver 160 of interface circuit 116b. Because interface circuit 116b is in the loop-back mode for the B-channel associated with SCC1 152, the digital samples provided to receiver 160 are not directed to the digital network over line 105, but rather they are provided to transmitter 162 of interface circuit 116b and transmitted on transmitter line TXDATA$_{IC}$ 138 and receiver line RXDATA 134. Since receiver 158 of SCC1 152 is enabled, the digital samples representing the tones generated in the analog device 108, are detected by processor 114b.

Figure 6:
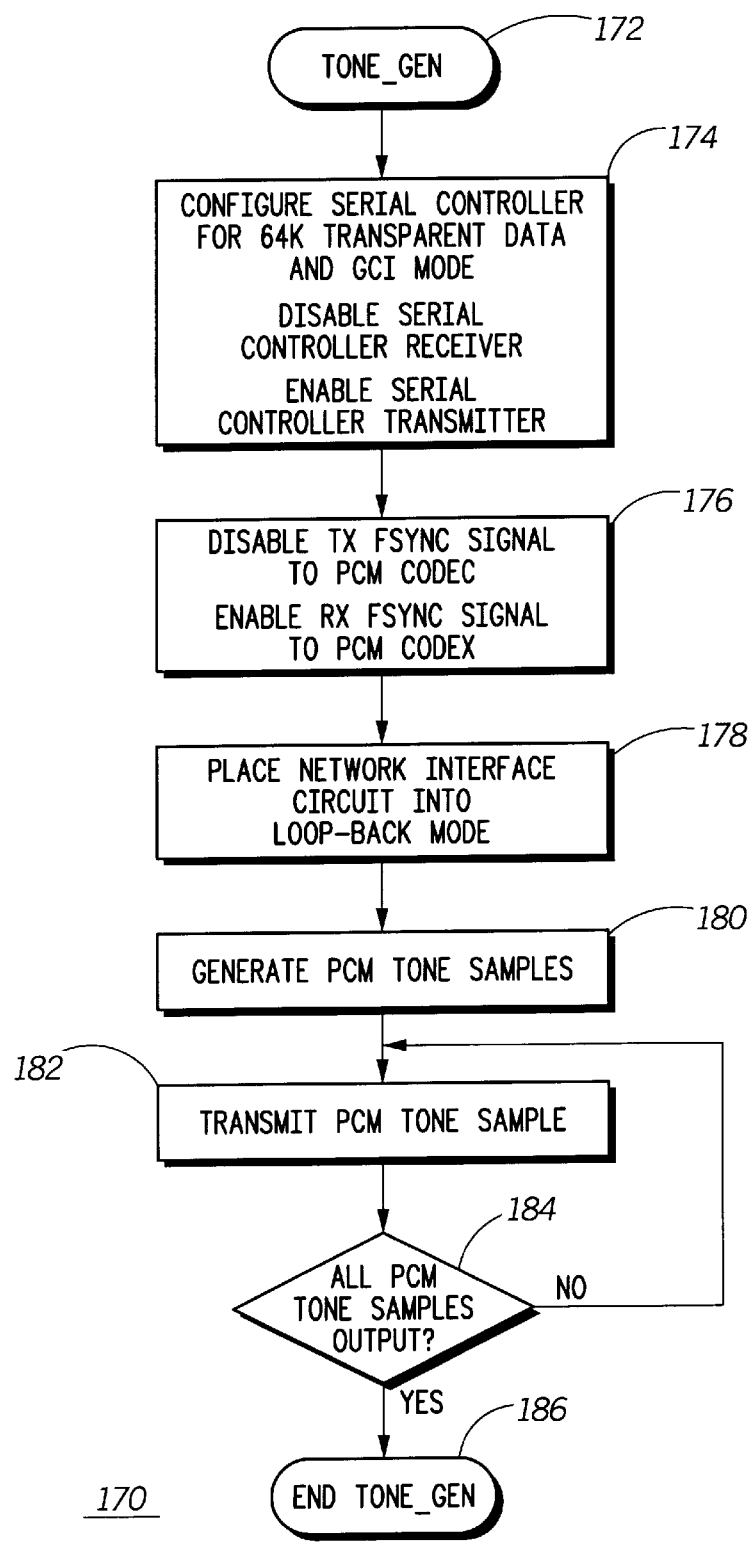
FIG. 6 is a flow diagram illustrating a method for generating tones in accordance with the present invention.

There is shown in FIG. 6, flow chart 170 which illustrates the steps for generating tones in processor 114b in accordance with the present invention. In response to an off-hook signal from analog device 108 or a signal from the network (via the D-channel), processor 114b begins the tone generation process, step 172, to generate a tone and provide it to analog device 108. In step 174, SCC1 152 is configured for 64K transparent data and GCI mode, processor 114b disables receiver 158 of SCC1 152, and processor 114b enables transmitter 156 of SCC1 152. Transparent data mode prevents the manipulation of data received or transmitted by SCC1 152 and SCC1 152 is placed in GCI mode so that SCC1 152 will have knowledge of the GCI frame structure. At step 176, processor 114b does not allow the frame synchronization signal to be provided to codec 120b over TX FSYNC line 142, effectively disabling the transmitter 166 and processor 114b allows the frame synchronization signal to be provided to codec 120b over RX FSYNC line 144, effectively enabling receiver 164. At step 178, processor 114b sends a loop-back command to interface circuit 116b via SCP 148 to place interface circuit 116b in the loop-back mode. Processor 114b then begins to generate the PCM tone samples at step 180 and transmits the samples at step 182. At step 184 it is determined if all of the PCM tone samples have been output. This determination is based upon the tone being generated and the state of the call. The tone may be discontinued as a result of a network indication, a DTMF digit being depressed, or a timer elapsing. If they have not, then the flow proceeds to step 182 where another PCM tone sample is transmitted. If all PCM tone samples have been output, at step 186 tone generation is terminated.

Figure 7:
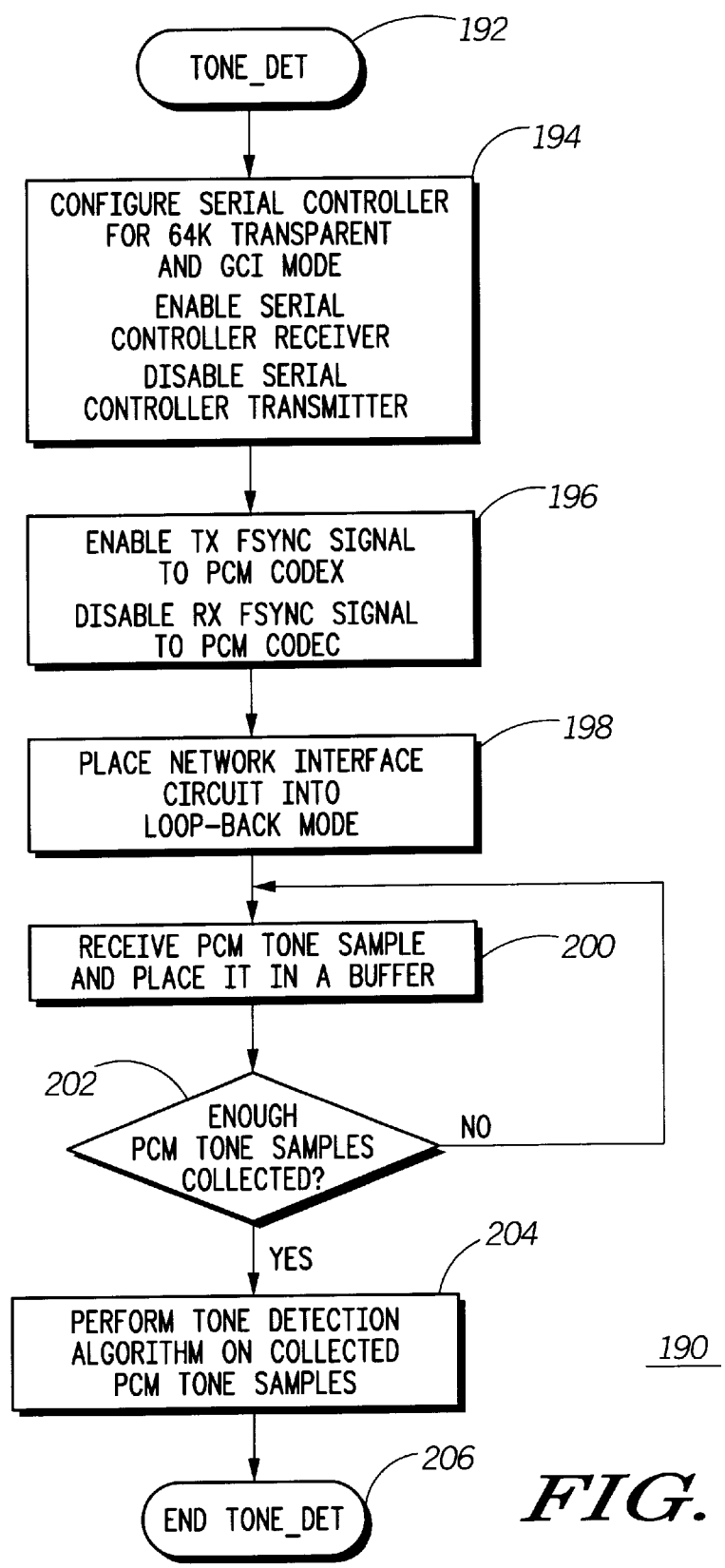
FIG. 7 is a flow diagram illustrating a method for detecting tones in accordance with the present invention.

There is shown in FIG. 7, flow chart 190 which illustrates the steps for detecting tones in processor 114b in accordance with the present invention. In response to an off-hook indication, for example, processor 114b begins the tone detection process, step 192, to detect a tone, such as a DTMF tone, generated in analog device 108. In step 194, SCC1 152 is configured for 64K transparent data and GCI mode, processor 114b enables receiver 158 of SCC1 152, and processor 114b disables transmitter 156 of SCC1 152. At step 196, processor 114b allows the frame synchronization signal to be provided to codec 120b over TX FSYNC line 142, effectively enabling transmitter 166 and processor 114b does not allow the frame synchronization signal to be provided to codec 120b over RX FSYNC line 144, effectively disabling receiver 164. At step 198, processor 114b sends a loop-back command to interface circuit 116b via SCP 148 to place interface circuit 116b in the loop-back mode. Processor 114b then begins to receive PCM tone samples and place the samples in a buffer at step 200. At step 202 it is determined if a sufficient number of tone samples have been collected. If an insufficient number of samples have been collected, the flow loops back to step 200 where an additional tone sample is received and placed in the buffer. If it is determined that a sufficient number of samples have been collected at step 202, at step 204 a tone detection algorithm, such as a Discrete Fourier Transform (DFT), is performed on the collected samples. There are numerous references on DFT algorithms and the particular algorithm used will be dependent upon the application which will be apparent to those skilled in the art. Descriptions of such algorithms may be found in, for example, the following textbooks: "Introduction To Digital Signal Processing" Macmillan Publishing Co. 1988 by Proakis et al and "Signal Processing In C" John Wiley & Sons, Inc. 1992 by Reid et al. Whether or not a sufficient number of samples have been collected is dependent on the algorithm used and on the sample rate. At step 206 tone detection is terminated.

In summary, as depicted in the figures and described in more detail above, the invention includes in a digital communication device 100b having an analog port adapted for interconnecting an analog device 108 to the digital communication device, a device for generating and detecting tones. The device includes a processor 114b programmed to selectively generate one of a first set of digital tones in a generation mode and to detect one of a second set of digital tones in a detection mode; and a conversion circuit 120b (PCM codec), operably coupled to the processor, adapted to convert the one of the first set of digital tones generated by the processor in the generation mode to an analog tone and transmit the analog tone to the analog device. The conversion circuit is further adapted to convert an analog tone received from the analog device to the one of the second set of digital tones and transmit the digital tone to the processor when the processor is in the detection mode.

In a preferred embodiment, there is further included an interface circuit 116b, operably coupled to the processor and the conversion circuit, which couples the one of the first set of digital tones generated by the processor in the generation mode to the conversion circuit and the one of the second set of digital tones to the processor when the processor is in the detection mode. There is further included a three-state PCM bus (GCI bus 130) interconnecting the processor, conversion circuit and interface circuit. The interface circuit includes a bus receiver 160 and a bus transmitter 162; and the interface circuit includes a loop-back mode which it is placed in when the processor is in the generation and detection modes; when the processor is in the generation mode, the bus receiver receives the one of the first set of digital tones from the bus and the bus transmitter transmits the tone over the bus to the conversion circuit for conversion to an analog tone and transmission to the analog device; and when the processor is in the detection mode, the bus receiver receives from the conversion circuit the one of the second set of digital tones provided to the bus and the bus transmitter transmits the tone over the bus to the processor for detection. There is further included a hybrid circuit 110b for coupling the analog tones between the conversion circuit and the analog device.

The invention also includes in a digital communication device having an analog port adapted for interconnecting an analog device to the digital communication device, a device for generating and detecting tones. The device includes a processor, interconnected to a bus, programmed to selectively generate one of a first type of digital tones and provide the digital tone to the bus in a generation mode and programmed to detect one of a second type of digital tones from the bus in a detection mode. There is a conversion circuit, interconnected to the bus, and adapted to convert the one of the first type of digital tones received from the bus generated by the processor in the generation mode to an analog tone and transmit the analog tone to the analog device. The conversion circuit is further adapted for converting an analog tone received from the analog device to the one of the second type of digital tones and providing the digital tone to the bus when the processor is in the detection mode. There is an interface circuit, interconnected to the bus, including a bus receiver and a bus transmitter; the interface circuit being configured in a loop-back mode when the processor is in the generation and detection modes. When the processor is in the generation mode, the bus receiver receives the one of the first type of digital tones from the bus and the bus transmitter transmits the tone over the bus to the conversion circuit for conversion to an analog tone and transmission to the analog device. When the processor is in the detection mode, the bus receiver receives from the conversion circuit the one of the second type of digital tones provided to the bus and the bus transmitter transmits the tone over the bus to the processor for detection.

The invention further includes in a digital communication device having an analog port adapted for interconnecting an analog device to the digital communication device, a device for detecting tones. The device includes a processor programmed to selectively detect one of a set of digital tones in a detection mode; and a codec, operably coupled to the processor, adapted to convert an analog tone received from the analog device to the one of the set of digital tones and to transmit the digital tone to the processor when the processor is in the detection mode.

This invention additionally includes in a digital communication device, a slave to slave communication system. The system has a first slaved unit capable of transmitting and receiving data; a second slaved unit capable of transmitting and receiving data; a master unit capable of transmitting and receiving data, wherein the master unit has a normal mode of operation and loop-back mode of operation; and a bus interconnecting the first slaved unit, the second slaved unit and the master unit. The first and second slaved units are capable of transmitting data to the other slaved unit over the bus via the master unit when the master unit is in the loop-back mode.

In a preferred embodiment the bus is a three-state PCM bus. The master unit includes a bus receiver and a bus transmitter and the bus receiver receives the data from the bus transmitted by one of the first slaved unit and the second slaved unit and the bus transmitter transmits the data over the bus to the other of the first slaved unit and the second slaved unit.

The method for detecting tones according to this invention includes placing the interface circuit in a loop-back mode; transmitting from the transmitter of the codec over the bus tones generated by the analog device; the interface circuit receiving the tones from the bus and transmitting on the bus the tones; and the processor detecting from the bus the tones transmitted by the interface circuit.

In a preferred embodiment the method further includes: enabling the receiver of the processor; disabling the transmitter of the processor; enabling the transmitter of the codes; and disabling the receiver of the codec. The step of detecting includes receiving a predetermined number of tone samples from the bus, storing the tone samples, and performing a detection algorithm on the stored tone samples.

The method for generating tones according to this invention includes: placing the interface circuit in a loop-back mode; transmitting tones from the transmitter of the processor over the bus; the interface circuit receiving the tones from the bus and transmitting on the bus the tones; and the receiver of the codec receiving from the bus the tones transmitted by the interface circuit.

In a preferred embodiment the method further includes: disabling the receiver of the processor; enabling the transmitter of the processor; disabling the transmitter of the codec; and enabling the receiver of the codec. The step of transmitting includes generating in the processor tone samples and transmitting the tone samples from the processor.

The tone processing device and method in accordance with the present invention provides the information transfer link between an analog device and a digital data communication device. The present invention reduces the number of components and amount of space required on a printed circuit board. In addition the method is flexible and may provide for any new services requiring modification of the existing tone generation and decoding specifications.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, or course, intended to cover by the appended claims all such modification as fall within the scope of the claims. The invention is further defined by the following claims.

What is claimed is:

1. In a digital communication device having an analog port adapted for interconnecting an analog device to the digital communication device, a device for generating and detecting tones, comprising:

a processor programmed to selectively generate one of a first set of digital tones in a generation mode and to detect one of a second set of digital tones in a detection mode;

a conversion circuit, operably coupled to the processor, adapted to convert the one of the first set of digital tones generated by the processor in the generation mode to an analog tone and transmit the analog tone to the analog device; the conversion circuit further being adapted to convert an analog tone received from the analog device to the one of the second set of digital tones and transmit the digital tone to the processor when the processor is in the detection mode; and an interface circuit, operably coupled to the processor and the conversion circuit, which couples the one of the first set of digital tones generated by the processor in the generation mode to the conversion circuit and the one of the second set of digital tones to the processor when the processor is in the detection mode.

2. The device of claim 1 further including a bus interconnecting the processor, conversion circuit and interface circuit.

3. The device of claim 2 wherein the bus is a three-state PCM bus.

4. The device of claim 2 wherein the interface circuit includes a bus receiver and a bus transmitter; and the interface circuit includes a loop-back mode which it is placed in when the processor is in the generation and detection modes; when the processor is in the generation mode, the bus receiver receives the one of the first set of digital tones from the bus and the bus transmitter transmits the tone over the bus to the conversion circuit for conversion to an analog tone and transmission to the analog device; and when the processor is in the detection mode, the bus receiver receives from the conversion circuit the one of the second set of digital tones provided to the bus and the bus transmitter transmits the tone over the bus to the processor for detection.

5. The device of claim 1 wherein the conversion circuit is a PCM codec.

6. The device of claim 1 further including a hybrid circuit for coupling the analog tones between the conversion circuit and the analog device.

7. In a digital communication device having an analog port adapted for interconnecting an analog device to the digital communication device, a device for generating and detecting tones, comprising:

a processor, interconnected to a bus, programmed to selectively generate one of a first type of digital tones and provide the digital tone to the bus in a generation mode; the processor further being programmed to detect one of a second type of digital tones from the bus in a detection mode;

a conversion circuit, interconnected to the bus, and adapted to convert the one of the first type of digital tones received from the bus generated by the processor in the generation mode to an analog tone and transmit the analog tone to the analog device; the conversion circuit further being adapted for converting an analog tone received from the analog device to the one of the second type of digital tones and providing the digital tone to the bus when the processor is in the detection mode; and an interface circuit, interconnected to the bus, including a bus receiver and a bus transmitter; the interface circuit being configured in a loop-back mode when the processor is in the generation and detection modes; when the processor is in the generation mode, the bus receiver receives the one of the first type of digital tones from the bus and the bus transmitter transmits the tone over the bus to the conversion circuit for conversion to an analog tone and transmission to the analog device; and when the processor is in the detection mode, the bus receiver receives from the conversion circuit the one of the second type of digital tones provided to the bus and the bus transmitter transmits the tone over the bus to the processor for detection.

8. The device of claim 7 wherein the bus is a three-state PCM bus.

9. The device of claim 7 wherein the conversion circuit is a PCM codec.

10. The device of claim 7 further including a hybrid circuit for coupling the analog tones between the conversion circuit and the analog device.

11. In a digital communication device, a slave to slave communication system, comprising:

a first slaved unit capable of transmitting and receiving data;

a second slaved unit capable of transmitting and receiving data;

a master unit capable of transmitting and receiving data, wherein the master unit has a normal mode of operation and loop-back mode of operation; and a bus interconnecting the first slaved unit, the second slaved unit and the master unit;

wherein the first and second slaved units are capable of transmitting data to the other slaved unit over the bus via the master unit when the master unit is in the loop-back mode.

12. The communication system of claim 11 wherein the bus is a three-state PCM bus.

13. The communication system of claim 11 wherein the master unit includes a bus receiver and a bus transmitter; and wherein the bus receiver receives the data from the bus transmitted by one of the first slaved unit and the second slaved unit and the bus transmitter transmits the data over the bus to the other of the first slaved unit and the second slaved unit.

14. In a digital communication device having an analog port adapted for interconnecting an analog device to the digital communication device, wherein the digital communication device includes a processor, a codec, and an interface circuit each having a transmitter and receiver interconnected to a bus and wherein the codec is operably coupled to the analog device, a method for detecting tones, comprising:

placing the interface circuit in a loop-back mode;

transmitting from the transmitter of the codec over the bus tones generated by the analog device;

the interface circuit receiving the tones from the bus and transmitting on the bus the tones; and the processor detecting from the bus the tones transmitted by the interface circuit.

15. The method of claim 14 further including:

enabling the receiver of the processor;

disabling the transmitter of the processor;

enabling the transmitter of the codec; and disabling the receiver of the codec.

16. The method of claim 14 wherein the step of detecting includes receiving a predetermined number of tone samples from the bus, storing the tone samples, and performing a detection algorithm on the stored tone samples.

17. In a digital communication device having an analog port adapted for interconnecting an analog device to the digital communication device, wherein the digital communication device includes a processor, a codec, and an interface circuit each having a transmitter and receiver interconnected to a bus and wherein the codec is operably coupled to the analog device, a method for generating tones, comprising:

placing the interface circuit in a loop-back mode;

transmitting tones from the transmitter of the processor over the bus;

the interface circuit receiving the tones from the bus and transmitting on the bus the tones;

the receiver of the codec receiving from the bus the tones transmitted by the interface circuit;

disabling the receiver of the processor;

enabling the transmitter of the processor;

disabling the transmitter of the codec; and enabling the receiver of the codec.

18. The method of claim 17 wherein the step of transmitting includes generating in the processor tone samples and transmitting the tone samples from the processor.

* * * * *